United States Patent [19]
Kelpin

[11] 4,177,624
[45] Dec. 11, 1979

[54] AQUATIC PLANT SAMPLER

[76] Inventor: Thomas G. Kelpin, 8877 Bayonne Dr., Shreveport, La. 71108

[21] Appl. No.: 840,095

[22] Filed: Oct. 6, 1977

[51] Int. Cl.² ............................................. A01D 44/00
[52] U.S. Cl. .......................................... 56/9; 175/20; 175/58; 175/249
[58] Field of Search ................. 56/8, 9; 175/20, 254, 175/249, 58, 308, 250; 37/71; 299/82

[56] References Cited
U.S. PATENT DOCUMENTS

| | | | |
|---|---|---|---|
| 1,628,042 | 5/1927 | Gates | 175/250 |
| 2,152,341 | 3/1939 | Baker | 175/254 |
| 2,496,101 | 1/1950 | Massey | 37/71 |
| 2,571,502 | 10/1951 | Uhland | 56/8 |
| 3,647,009 | 3/1972 | Drelicharz | 175/254 |
| 3,878,904 | 4/1975 | Dobson | 175/58 |
| 3,890,771 | 6/1975 | Kelpin | 56/9 |
| 4,070,978 | 1/1978 | Virgilio | 56/8 |

*Primary Examiner*—Jay N. Eskovitz

[57] ABSTRACT

An aquatic plant sampler which includes an aquatic craft characterized by a plurality of pontoons secured to a flat deck member and propelled and steered by a dual power system including an above water air propulsion system and an underwater, inboard, outboard or inboard-outboard propulsion system. The aquatic plant sampler is further characterized by a sampling bucket fitted with a chain driven cutter system, which bucket is capable of being lowered through a hole provided in the center of the barge to collect aquatic plant specimens and water bottom samples for analysis with a view toward controlling such aquatic vegetation in lakes, rivers and reservoirs.

20 Claims, 16 Drawing Figures

AQUATIC PLANT SAMPLER

BACKGROUND OF THE INVENTION

1. Field of the Invention

This invention relates to the collection of aquatic growth in inland and coastal rivers, lakes, and reservoirs, and more specifically, to an aquatic plant sampler which is designed to determine the concentrations of bottom-rooted vegetation in such bodies of water by taking numerous samples and extrapolating the results of such sampling to estimate the amount and types of marine vegetation in the body of water. Such information is vitally important in order to determine methods and techniques of controlling aquatic vegetation, and in continuously monitering the effectiveness of such control techniques. The aquatic plant sampler of this invention is designed to be quickly and easily moved from one body of water to another, and is also designed to be quickly and easily set up for securing multiple samples at substantially any depth on any lake, river or reservoir under investigation.

2. Description of the Prior Art

It is well known that all inland bodies of water are subject to a natural aging process which can be broadly characterized by three stages. The first stage is generally characterized by clear water, with smooth, substantially vegetation-free banks and low aquatic plant productivity. In the second stage, sediment and algae begins to accumulate on the bottom and banks of the water body, and vegetation begins to grow on the shore. Water productivity increases with a steadily increasing nutrient content. In the last stage of the aging process the water body is filled with silt and organic sediment, and marshy areas appear around the banks with extensive vegetation on the banks. The water gradually becomes filled with various forms of aquatic vegetation which encroaches from the bank area toward the center of the water body.

This aging process is constantly being accelerated by industrial waste, untreated or inadequately treated sewage effluent and other chemical discharge into inland rivers, lakes and reservoirs. The result has been a rapid increase in the growth rate of aquatic plant life in these water bodies to the extent that many of them have been rendered unsafe, unusable and unhealthy, and some have been effectively neutralized as a usable natural resource.

Recognition of this problem has precipitated a number of remedial projects, including removal of phosphates from detergents, but thus far preventative efforts to deal with the problem have fallen far short of effectively controlling it. Steps have also been taken to remove accumulated aquatic plant life by poisoning, water level control and by introducing certain varieties of fish into the striken water body, but these attempts to control the vegetation have thus far met with limited success. Apparatus for harvesting the vegetation have been proposed, such as the apparatus disclosed in my U.S. Pat. No. 3,698,163, and this technique may well prove to be the most effective way to deal with the problem in many instances.

The marine life which has enjoyed such a prolific reproduction in our inland lakes, rivers and reservoirs seems to have a tendency to grow extremely rapidly in such water bodies regardless of whether the bodies are characterized by clarity or turbidity. While the growth appears to reproduce particularly rapidly in clear water it is also found in lakes, streams and reservoirs which are turbid, and in many cases is present to the extent that it chokes out other aquatic growth and completely covers the body of water in question. Such plant life includes several varieties of moss, algae, and water hyacinth, and while spraying techniques have met with limited success in controlling such growth, the only known technique of effectively controlling these aquatic plants on a continuing basis is periodically lowering the water level to permit the sun to kill the growth.

There have been developed in the prior art no known techniques for accurately measuring aquatic growth at varying water depths to determine the extent and rapidity of growth and to accurately assess conditions for controlling such growth. Conventional attempts to gather such samples have generally taken the form of sample gathering by means of small boats, which samples have been generally limited to surface growth quantities with very little effort being made to procure samples of aquatic growth at varying depth levels, including bottom samples. These efforts are frequently hampered by the difficulty of maneuvering a watercraft into an area choked with aquatic life because of the difficulty of operating outboard motors in such areas due to entanglement of the growth in the motor propellor. Even propulsion of small boats through such growth by paddles has proved difficult, and the small size of such boats renders the collection of numerous samples or samples of significant size difficult.

Accordingly, it is an object of this invention to provide a new and improved aquatic biological mass sampler which is capable of procuring a substantially unlimited number of aquatic plant samples at varying water depths, including water bottom samples.

Another object of this invention is to provide an aquatic plant sampler which is mounted on a barge and can be lowered into the water to procure samples at substantially any water depth, including bottom samples, which sampler is characterized by a collecting bucket equipped with cutter blades for cutting the aquatic growth and boring into the bottom of the reservoir, lake or pond to secure bottom samples.

Yet another object of the invention is to provide a new and improved barge-mounted aquatic growth sampler which is characterized by a bucket having a bottom which can be selectively opened and closed while the bucket is submerged, and a cutter blade apparatus which is capable of isolating a sample for entrapment in the bucket when the bucket is lowered by means of a chain into the water of a lake, pond, river or reservoir to procure a sample of the marine growth or water bottom in the water body.

Still another object of this invention is to provide an aquatic plant sampler which is characterized by a pontoon-equipped watercraft having a hole cut in the deck for lowering a collecting bucket having cutter blades for severing the aquatic growth and inwardly opening bottom panels for collecting the severed and "cored" growth, which barge is also equipped with both underwater and top water propulsion means.

A still further object of this invention is to provide an aquatic plant sampling watercraft which includes a barge floated by a pair of pontoons and selectively driven by an air propulsion system and an inboard, inboard-outboard or outboard propulsion system, and a sampling bucket fitted with rotating cutter blades and a bottom capable of being selectively opened and closed to cut and hold a sample of aquatic vegetation or a water bottom sample, which bucket can be lowered at a selected rate into the water and retrieved at a selected rate after a sample is secured at substantially any specified water depth.

SUMMARY OF THE INVENTION

These and other objects of the invention are provided in an improved aquatic plant sampler characterized by an aquatic craft including a plurality of pontoons secured to a flat deck member, which craft is, in a preferred embodiment, propelled and steered by a dual propulsion system including an air propulsion system and an underwater engine propulsion system, the collecting apparatus of which craft is characterized by a collecting bucket having rotating, chain-driven cutter blades mounted on the bottom thereof and inwardly opening bottom panels to cut, receive, and hold samples of aquatic growth and water bottom samples as the bucket is lowered through a hole provided in the craft.

BRIEF DESCRIPTION OF THE DRAWINGS

The invention will be better understood in view of the following description presented with reference to the accompanying drawings.

DESCRIPTION OF THE PREFERRED EMBODIMENTS

Figure 1:
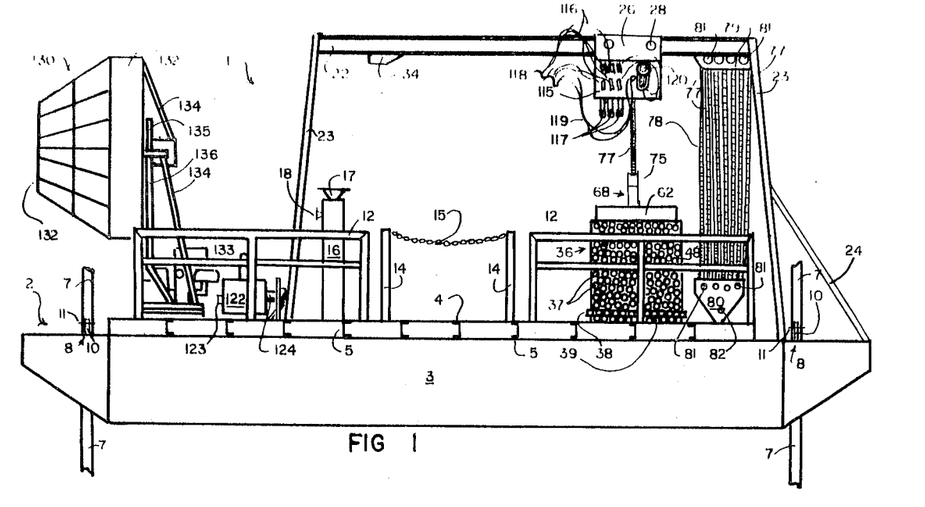
FIG. 1 of the drawings is a side elevation of the aquatic plant sampling craft of this invention.
Figure 2:
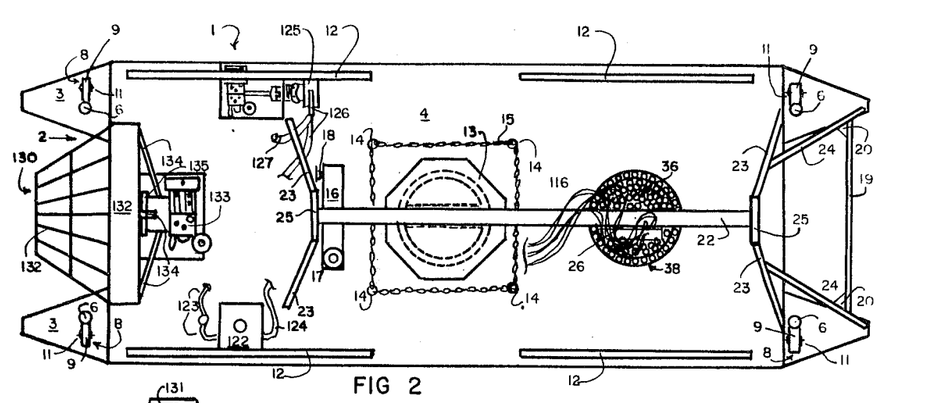
FIG. 2 is a top elevation of the aquatic plant sampling craft illustrated in FIG. 1.
Figures 3, 4, 5:
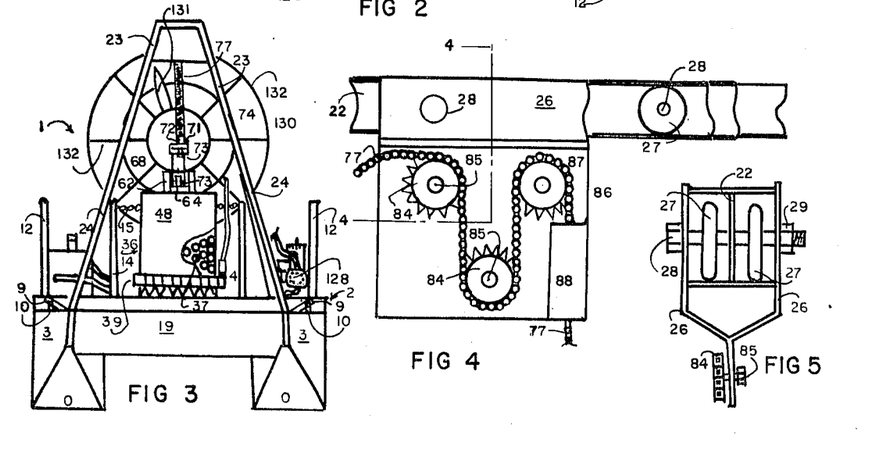
FIG. 3 is a rear elevation of the aquatic plant sampling craft illustrated in FIGS. 1 and 2.
FIG. 4 is a side elevation, partially in section, of a preferred trolley for moving the sampling bucket into position prior to lowering it into the water to collect samples.
FIG. 5 is an end elevation taken along lines 4—4 of FIG. 4, more particularly showing the structure of the preferred trolley.

Referring now to FIGS. 1–3 of the drawings, the aquatic plant sampler of this invention is generally illustrated by reference numeral 1, and is characterized by an aquatic craft, generally illustrated by reference numeral 2, which includes pontoon members 3, fitted with a deck member 4 by means of deck channels 5. As illustrated in FIGS. 1 and 2, pontoon apertures 6 are provided at the front and rear of pontoon members 3 in order to permit insertion of anchor poles 7 to position the craft precisely in a desired location without unduly disturbing the water bottom. Anchor poles 7 are typically formed of fiberglass to maximize strength and reduce weight. In order to properly stabilize aquatic craft 2 in the course of collecting suitable samples, pole locks 8 are provided in the vicinity of pontoon apertures 6 to lock anchor poles 7 securely in position. Pole locks 8 are each characterized by a pivoting member 9, mounted on a fulcrum 10 by means of fulcrum pins 11, and one end of each pivoting member 9 is designed to contact each one of anchor poles 7 to lock it at the desired depth.

Deck rails 12 are provided as illustrated on deck member 4 of aquatic craft 2 for safety purposes, and in like manner, bucket aperture rails 14, provided with rail chains 15 cooperating therebetween, are also installed in order to prevent an operator from inadvertently stumbling and falling into bucket aperture 13, all as is more particularly illustrated in FIG. 2 of the drawings. Steering console 16 is provided on deck member 4 to mount air propulsion steering wheel 17 and outboard motor steering wheel 18 for convenient use by an operator as aquatic craft 2 is maneuvered into position for collecting samples. It will be appreciated that while aquatic craft 2 may be typically fitted with an outboard motor (not illustrated) on outboard motor mount 19, alternative means of underwater drive systems may be used, including inboard mounted engines, inboard-outboard mounted systems, and jet drive systems, according to the knowledge of those skilled in the art. In a preferred embodiment of the invention, an outboard motor is utilized to transport aquatic craft 2 to and from the sampling area, while an air propulsion unit, generally illustrated by reference numeral 130, is used to maneuver the craft into a precise sampling configuration within the sampling area, where it is anchored by using anchor poles 7 and anchor pole locks 8, as described above. This technique minimizes water and surface plant life disturbance, and permits collection of samples of high quality. Outboard motor mount gussets 20 are provided to strengthen outboard motor mount 19, and it will be appreciated that an outboard motor of substantially any size can be utilized to drive aquatic craft 2, depending upon the weight and size of aquatic craft 2 and as desired by the operator.

Figure 14:
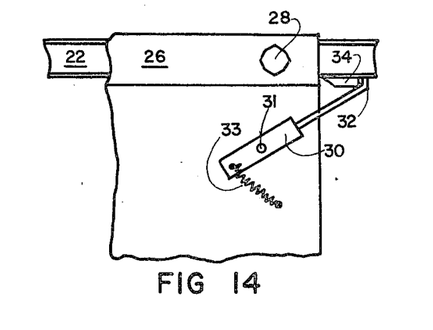
FIG. 14 is a side elevation, partially in section, illustrating a preferred trolley latch mechanism for securing the movable trolley in position directly over the access hole provided in the aquatic craft to insure that the collecting bucket is lowered through the center of the hole.

Aquatic craft 2 is fitted with overhead rail 22, preferably formed in the shape of an "I" beam and secured into position essentially parallel to deck member 4 of aquatic craft 2, by means of rail mounts 25 and rail legs 23 forming a pair of "A" frames to support the weight of sampling bucket 36. Rail leg braces 24 are also attached to rail legs 23 and pontoon members 3 for added support of overhead rail 22. Overhead rail 22 is preferably secured directly to rail mounts 25 located at each end of overhead rail 22, and rail mounts 25 are in turn secured to rail leg braces 24 as illustrated, in a preferred embodiment of the invention. A trolley 26 is movably mounted on overhead rail 22, and is positioned to traverse the span of overhead rail 22 between trolley latch plate 34 and lift chain accumulator 78. Trolley 26 is fitted with trolley rollers 27 more particularly illustrated in FIGS. 4 and 5 of the drawings, which are positioned to ride on either side of the lower horizontal flange members of overhead rail 22, and are secured in position by means of trolley roller bolts 28, fitted with trolley roller nuts 29, as illustrated. Referring now to FIG. 14 of the drawings, trolley 26 may be secured in position directly over bucket aperture 13 when it is desired to initiate the sampling procedure by rolling trolley 26 forward along overhead rail 22 until trolley latch tooth 32 of trolley latch 30 engages trolley latch plate 34, and secures trolley 26 in position. Trolley latch tooth 32 is biased against overhead rail 22 and trolley latch plate 34 by means of trolley latch spring 33, and is pivotally mounted on trolley 26 by means of trolley latch bolt 31.

Figures 6, 7, 8, 9, 10:
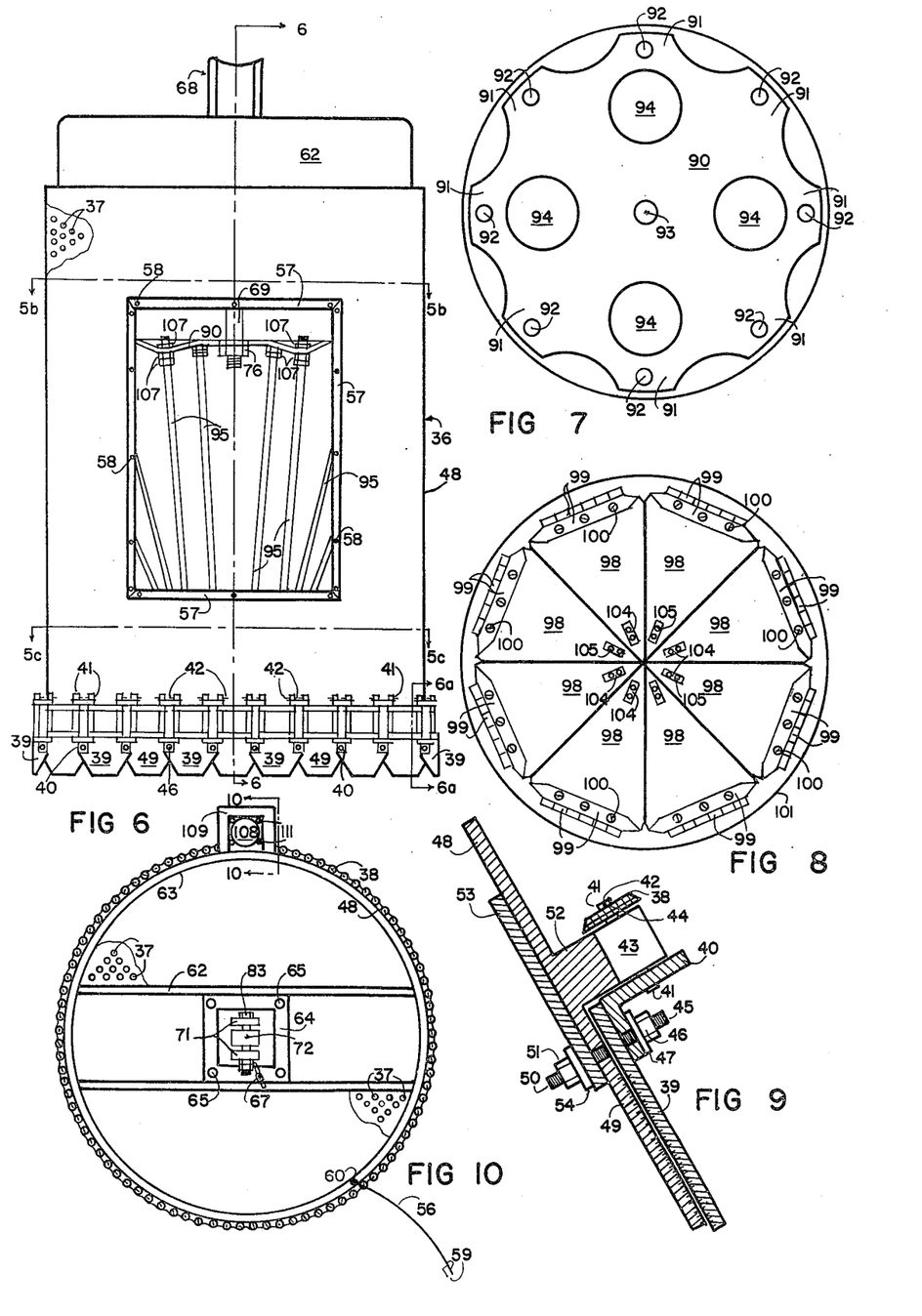
FIG. 6 is a side elevation of a preferred collecting bucket of this invention with the access door removed.
FIG. 7 is a top elevation of the bucket lift plate positioned in the interior of the collecting bucket illustrated in FIG. 6 of the drawings.
FIG. 8 is a top elevation of a preferred configuration of bucket bottom plates also mounted in the interior of the collection bucket below the bucket lift plate illustrated in FIG. 7 of the drawing.
FIG. 9 is a sectional view taken along lines 6a—6a of FIG. 6, more particularly illustrating a preferred relationship between the stationary cutter blades and moving cutter blades in the collecting bucket illustrated in FIG. 6.
FIG. 10 is a top elevation of the collecting bucket illustrated in FIG. 6.

Referring again to FIGS. 1-3 and 6 of the drawings, the bucket wall 48 of sampling bucket 36 is preferably constructed of 11 gauge perforated stainless steel plate having 0.25 inch bucket apertures 37, on ⅜ inch staggered centers in order to permit adequate drainage as the bucket is retrieved from the water and a suitable rate of descent as a sample is collected. Sampling bucket 36 is fitted with a set of stationary cutter blades 49 and a set of rotating chain cutter blades 39 mounted on a cutter chain 38, as illustrated in FIG. 6 of the drawings, in order to isolate specific samples of aquatic growth for collection. Referring now to FIGS. 6, 9 and 10 of the drawings, cutter chain 38 is characterized by cutter chain brackets 40, which carry chain cutter blades 39 by means of countersunk chain cutter bracket bolts 45, chain cutter bracket washers 47 and chain cutter bracket nuts 46. Cutter chain 38 also includes chain cutter pins 41, carrying chain cutter roller plates 44, and secured by chain cutter pin retainers 42, and chain cutter rollers 43 are provided to traverse chain race 52, as illustrated in FIG. 9 of the drawings. As further illustrated in FIGS. 9, 11 and 12, stationary cutter blades 49 are secured to stationary cutter blade chain ring 53 by means of stationary cutter blade bolts 50, the heads of which are countersunk in stationary cutter blades 49, as illustrated, stationary cutter blade washers 54, and stationary cutter blade nuts 51. It will be appreciated that as chain cutter blades 39 rotate on cutter chain 38 with respect to stationary cutter blades 49, all aquatic vegetation which comes into contact with the rotating blade system is severed in a "core", and is then susceptible of being collected as a sample inside sampling bucket 36, as hereinafter described.

Referring again to FIGS. 6 and 10 of the drawings, access to the interior of sampling bucket 36 is provided by means of opening 55 in bucket wall 48, and bucket door 56, particularly illustrated in FIG. 10, which door is mounted to bucket wall 48 by means of bucket door plates 57, bucket door plate screws 58, and bucket door hinge 60, and is secured in closed position by means of bucket door latch 59.

Figure 11:
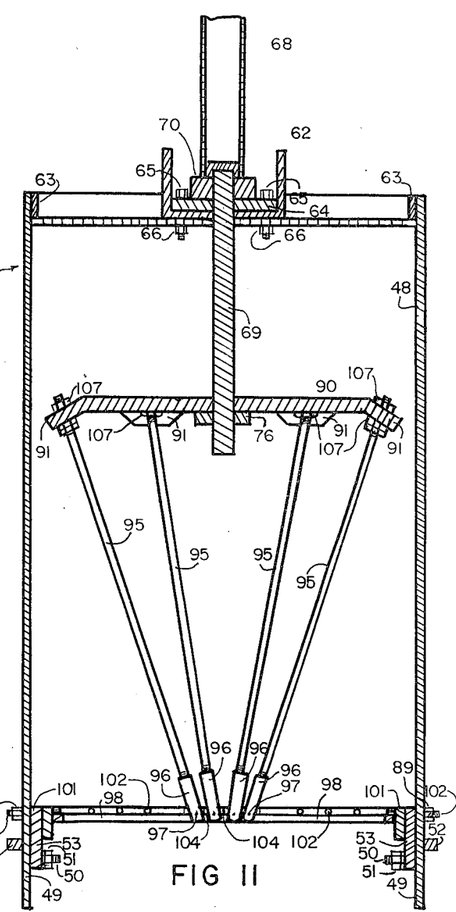
FIG. 11 is a side sectional view taken along lines 6—6 in FIG. 6, more particularly showing the internal operation and cooperation between the bucket lift plate and the bucket bottom plates, when the bucket bottom plates are in closed configuration.
Figure 12:
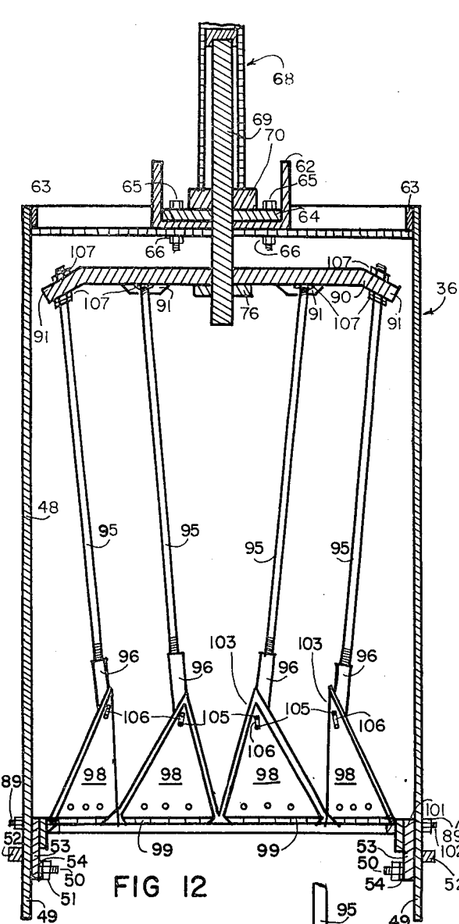
FIG. 12 is a side sectional view taken along lines 6—6 in FIG. 6 showing the bucket bottom plates in open configuration to receive a "cored" sample.

In a preferred embodiment of the invention, sampling bucket 36 is moved into lowering configuration and is raised and lowered from deck member 4 of aquatic craft 2 by means of a hydraulic fluid system and a lift chain 77, as hereinafter described. Referring to FIGS. 1, 3 and 10-12, lift chain 77 is attached to sampling bucket 36 by means of lift chain bracket 72, hydraulic cylinder bracket 71, and hydraulic cylinder bracket bolt 83 and hydraulic cylinder bracket 71 is bolted to hydraulic cylinder 68, carried by bucket lift bracket plate 64 and bucket lift bracket bolts 65, secured by bucket lift bracket nuts 66. Bucket lift bracket 62 is welded to bucket lift bracket ring 63, which is in turn welded to bucket wall 48 of sampling bucket 36. A shock absorber 75 is provided around lift chain 77 and lift chain bracket 72 to cushion inadvertent impact between lift chain bracket 72 and lift chain guide 88 of trolley 26, as illustrated in FIG. 1. Bucket lift bracket 62 is mounted on the top of a double-action hydraulic cylinder 68, as illustrated in FIGS. 11 and 12 of the drawings. Hydraulic cylinder 68 is fitted with hydraulic cylinder piston 69 and hydraulic cylinder base 70, and is activated by means of hydraulic cylinder pressure fittings 73, to which are connected hydraulic cylinder pressure hoses 74, as shown in FIG. 3. As further illustrated in FIGS. 7, 11 and 12 of the drawings, hydraulic cylinder piston 69 is fitted through bucket lift plate piston aperture 93 and is attached to bucket lift plate 90 by means of hydraulic cylinder piston nut 76, and is therefore operable to raise and lower bucket lift plate 90 as hereinafter described. Bucket lift plate 90 is fitted with water flow apertures 94 as illustrated in FIG. 7 to facilitate descent of sampling bucket 36 at a suitable rate. The action of raising and lowering hydraulic cylinder piston 69 of hydraulic cylinder 68 effects a closing and opening of bucket bottom plates 98, as illustrated in FIGS. 8, 11 and 12, since bucket lift plate 90 is connected to each of eight bucket bottom plates 98 by means of bucket lift plate rods 95. Bucket bottom plates 98 are each provided with a bevel 103, and are secured to bottom plate hinges 99 by means of bottom plate hinge bolts 100, and bottom plate hinges 99 are in turn welded to bottom plate ring 101. Bottom plate ring 101 is secured to stationary cutter blade chain ring 53 by welding, and to bucket wall 48 by means of bottom plate ring bolts 102 and bottom plate ring nuts 89. Each of bucket lift plate rods 95 is fitted with an adjustable bucket lift plate rod cleavis 96 on one end thereof, which is in turn pivotally attached to one of bottom plate brackets 104 by means of a clevis pin 97. Bottom plate brackets 104 are secured to bucket bottom plates 98 by means of bottom plate bracket bolts 105. Bottom plate slots 106 are provided in each of bucket bottom plates 98 to permit adjustment of bottom plate brackets 104 in order to facilitate smooth raising and lowering of bucket bottom plates 98 as bucket lift plate 90 is raised and lowered by the action of hydraulic cylinder 68. The threaded opposite ends of bucket lift plate rods 95 are secured to bucket lift plate mounts 91 in bucket lift plate mount apertures 92 by means of bucket lift plate rod nuts 107.

Referring again to FIG. 1 of the drawings, lift chain accumulator 78 includes lift chain accumulator bracket 79, lift chain accumulator base 80 and four idler sprockets (not illustrated) mounted on both lift chain accumulator bracket 79 and lift chain accumulator base 80 by means of lift chain accumulator sprocket bolts 81. Lift chain accumulator base 80 is normally secured to a bracket (not illustrated) mounted on deck member 4, by means of lift chain accumulator base bolt 82 when not in use. Lift chain accumulator 78 is used to provide spare chain when sampling bucket 36 is lowered into the water to collect samples.

Referring again to FIGS. 4 and 5 of the drawings, it will be appreciated that trolley 26 is fitted with trolley idler sprockets 84, mounted to trolley 26 by means of trolley idler sprocket bolts 85, and designed to carry lift chain 77. Lift chain drive sprocket 86, carried by lift chain drive sprocket bolt 87 and driven by chain lift motor 120 (illustrated in FIG. 1 of the drawing), is rotatably mounted adjacent trolley idler sprockets 84 and drives lift chain 77 responsive to actuation of control valve 115, as hereinafter described. Lift chain 77 is positioned on chain drive sprocket 86 and is directed downwardly through lift chain guide 88 to its point of attachment with lift chain bracket 72.

Figures 13, 15, 16:
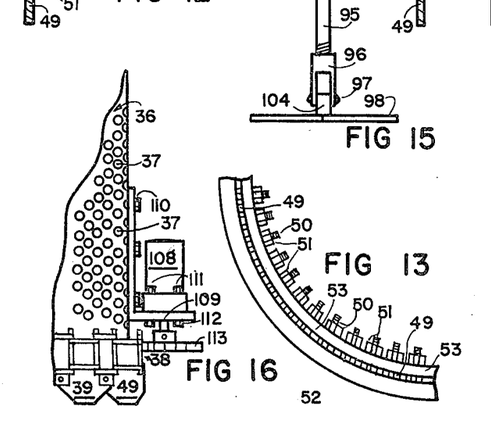
FIG. 13 is a bottom view, partially in section, of the stationary cutter blades illustrated in FIGS. 11 and 12, more particularly showing the position of the stationary cutter blades as mounted on the collecting bucket.
FIG. 15 is a side elevation, partially in section, illustrating cooperation of the bucket lift plate rods with the bucket bottom plates to permit raising and lowering of the bucket bottom plates.
FIG. 16 is a side elevation, partially in section, more particularly illustrating a preferred drive mechanism for operating the chain drive and cutter blade system for effecting severing of a sample of aquatic plant life or water bottom material.

Referring now to FIGS. 10 and 16 of the drawings, chain drive motor 108 is positioned on chain drive motor bracket 109, which is in turn mounted on bucket wall 48 of sampling bucket 36 by means of chain drive motor bracket bolts 110. Chain drive motor 108 is mounted on chain drive motor bracket 109 by chain drive motor bolts 111 and chain drive motor nuts 112, and is fitted with chain drive motor sprocket 113, which engages cutter chain 38 to facilitate circular rotation of chain cutter blades 39 with respect to stationary cutter blades 49. Cutter chain 38 rotates on cutter blade chain race 52 at a rotational speed determined by control valve 115 by the action of chain drive motor 108, which is preferably hydraulically activated, as hereinafter described.

Referring again to FIG. 1 of the drawing, control valve 115 is illustrated, with control valve hoses 116 cooperating with chain drive motor 108, chain lift motor 120, and hydraulic cylinder 68 to selectively permit sampling bucket 36 to be raised and lowered, bucket bottom plates to be raised and lowered, and cutter chain 38 to be activated by means of control valve levers 117. Hydraulic fluid is forced into control valve hydraulic fluid inlet 118 of control valve 115 and selectively through control valve hoses 116 pursuant to the manipulation of control valve levers 117, and finally through control valve hydraulic fluid outlet 119. The motive hydraulic fluid is stored in hydraulic fluid reservoir 122, and is pumped through hydraulic fluid reservoir outlet 123, through control valve 115, and back into hydraulic fluid reservoir inlet 124 by means of hydraulic fluid pump 125. Hydraulic fluid pump 125 is fitted with hydraulic fluid pump outlet 126 and hydraulic fluid pump inlet 127, and is driven by hydraulic fluid engine 128, and in a preferred embodiment of the invention, is characterized as a gear pump.

Referring again to FIGS. 1-3 of the drawings, and as heretofore described, aquatic craft 2 is fitted with an air propulsion unit 130, with a propeller 131, a propeller guard 132, fitted with braces 134, and an air propulsion engine 133 for driving propeller 131 by means of propeller pulley 135 and propeller pulley belt 136. The air propulsion unit 130 is used in order to manuever aquatic craft 2 in the general area of sampling without unduly disturbing the aquatic growth immediately beneath the surface of the water.

In operation the aquatic plant sampler 1 of this invention is used as follows: Referring again to FIGS. 1-3 of the drawing, aquatic craft 2 is initially propelled to the sampling area by an outboard motor (not illustrated) mounted on outboard motor mount 19 and steered by means of outboard motor steering wheel 18 and a conventional steering apparatus (not illustrated) connecting the outboard motor and outboard steering wheel 18. Upon reaching the sampling area, the outboard motor is stopped and air propulsion engine 133, which drives propeller 131 in air propulsion engine 130 is started, and aquatic craft 2 maneuvered into a selected position to begin collecting samples. Steering of air propulsion unit 130 is effected by air propulsion steering wheel 17 and a system of pulleys, belts and gearboxes linking the air propulsion unit to air propulsion steering wheel 17. When the desired sampling configuration is achieved, at leat two, and as many as four anchor poles 7 are inserted in pontoon apertures 6 in pontoon members 3 and forced downwardly into the bottom of the water body to anchor aquatic craft 2 in the desired position. Anchor plates 7 are then clamped in position by wedging pivoting member 9 of pole locks 8 against each one of anchor poles 7 to secure aquatic craft 2 from drifting out of position.

When aquatic craft 2 is properly secured, hydraulic fluid engine 128 is started and lift chain accumulator base bolt 82 is removed from the deck member bracket which secures lift chain accumulator base 80 to deck member 4. This permits lift chain 77 to be removed from lift chain accumulator 78 as sampling bucket 36 is moved into functional position.

After lift chain accumulator base 80 is freed from the deck member bracket, the one of control valve levers 117 of control valve 115 which is hydraulically coupled to chain lift motor 120 by means of a corresponding pair of control valve hoses 116 is activated to divert hydraulic fluid entering control valve 115 through control valve hydraulic fluid inlet 118 through the control valve hoses 116 to activate chain lift motor 120 and raise sampling bucket 36. Referring to FIGS. 1 and 4, sampling bucket 36 is pulled upwardly when chain lift motor 120 is activated, by the action of lift chain drive sprocket 86 on lift chain 77. When sampling bucket 36 is raised to a sufficient height to permit lateral travel, trolley 26 is caused to move toward bucket aperture 13 on overhead rail 22 as sampling bucket 36 is pulled forward. Referring again to FIGS. 2 and 14 of the drawings, when sampling bucket 36 has reached a position directly over bucket aperture 13 as illustrated in FIG. 2 of the drawing, trolley latch 30 engages trolley latch plate 34 on overhead rail 22 to secure bucket 36 into position for lowering through bucket aperture 13 and into the water, as illustrated in FIG. 14. The appropriate one of control valve levers 117 is then manipulated to hydraulically activate chain drive motor 108 and initiate rotation of cutter chain 38 on chain race 52, as illustrated in FIGS. 6, 9 and 10 of the drawings.

When rotation of cutter chain 38 and chain cutter blades 39 is initiated at a satisfactory rotational speed, bucket door latch 59 is secured and the one of control valve levers 117 which controls chain lift motor 120, and thus, ascent and descent of sampling bucket 36, is activated, and sampling bucket 36 is lowered through bucket aperture 13 and into the water below. The speed of descent of sampling bucket 36 is preferably controlled in the hydraulic control system by a pair of restrictor valves (not illustrated) positioned in the inlet and outlet fittings of chain lift motor 120. Manipulation of these restrictor valves not only serves to control the rate of ascent and descent of sampling bucket 36, but also to determine the rotational speed of cutter chain 38, since it has been found that diversion of substantially all of the hydraulic fluid entering control valve 115 through chain lift motor 120 to attain high bucket ascent and descent speeds leaves insufficient pressure to properly operate chain drive motor 108.

Referring now to FIGS. 11 and 12 of the drawings, when sampling bucket 36 reaches a preselected depth, and while it is still sinking, the third one of control valve levers 117 is manipulated to cause hydraulic fluid to flow through hydraulic cylinder pressure hoses 74 and hydraulic cylinder pressure fittings 73 of hydraulic cylinder 68 to activate hydraulic cylinder 68 and cause hydraulic cylinder piston 69 to move from the position illustrated in FIG. 11 to that shown in FIG. 12. This action effects an opening of bucket bottom plates 98 to permit a sample of aquatic growth which has been severed and "cored" by the rotation of cutter chain 38 to move past bucket bottom plates 98 into the interior of sampling bucket 36. Bucket bottom plates 98 are held in the open position for a preselected period of time to collect a sample at specified water depths, after which time the appropriate one of control valve levers 117 is manipulated in reverse, and bucket bottom plates 98 are closed by the action of hydraulic cylinder 68, the bevel 103 on bucket bottom plates 98 functioning to cleanly cut late entering strands of aquatic life and enclose the desired sample. Sampling bucket 36 is then raised to its former position above bucket aperture 13 by reversing the flow of hydraulic fluid in chain lift motor 120 by action of the appropriate one of control valve levers 117 as heretofore described, and is subsequently moved rearwardly on overhead rail 22 and lowered to again rest on deck member 4 of aquatic craft 2. Bucket door 56 is then opened by manipulation of bucket door latch 59 as illustrated in FIGS. 6 and 10 of the drawings, and the sample is removed for analysis, which may include sorting according to class, size and weight of vegetation or bottom mass, and other measurement according to the objectives of the particular collection mission.

It will be appreciated by those skilled in the art that cutter chain 38 can be activated at any depth in the descent of sampling bucket 36 in order to obtain specific samples at particularly delineated water depths from the surface to the bottom of the water body under investigation. Bottom samples can also be collected by permitting chain cutter blades 39 and stationary cutter blades 49 to bore into the bottom mass to a preselected depth to collect a sample of appropriate size. Since some loss of such a bottom sample can be anticipated due to the washing action realized during ascent of sampling bucket 36, this factor must be taken into consideration when the sample is being collected.

It will be appreciated that the optimum size of sampling bucket 36 is limited only by practical considerations such as the size of aquatic craft 2. However, the size of the bucket should be proportional to the pitch of cutter chain 38 since the chain must be driven 360 degrees around a chain race of slightly larger diameter than the bucket itself. In a preferred embodiment of the invention, cutter chain 38 is preferably characterized by a stainless steel number 80 roller (single) pinned chain, every other link having a B-1 bracket attachment for securing stationary cutter blades 49. Furthermore, a preferred collecting (bottom) area of sampling bucket 36 when such a cutter chain is used is 0.256969 square meters, and bucket wall 48 of sampling bucket 36 is preferably formed of perforated No. 304 stainless steel having ¼ inch openings on ⅜ inch staggered centers, which permits a 20 meter per minute rate of descent and ascent of sampling bucket 36. A knowledge of the descent rate is necessary in order to procure samples at specified depths, as heretofore described.

In another preferred embodiment of the invention, the hydraulic pressure is supplied by a gear pump having a flow capacity of 5 gallons per minute and driven by an 8 horsepower engine. Under such circumstances, lift chain 77 is preferably characterized as a stainless steel, number 60 roller (single) chain, and is sufficiently long to permit sampling bucket 36 to be lowered to a depth of about 13 meters. In this regard, and referring again to FIG. 1 of the drawings, it will be further appreciated that a sampling bucket 36 is lowered into the water, lift chain 77 pays out from the idler sprockets in lift chain accumulator 78, and lift chain accumulator base 80 rises toward overhead rail 22 as the chain is depleted. Conversely, when sampling bucket 22 is raised, the weight of lift chain accumulator base 80 is sufficiently chosen to compensate for the lift chain weight, to cause the accumulating links of lift chain 77 to again move across the idler sprockets and smoothly accumulate in lift chain accumulator as lift chain accumulator base 80 moves downwardly toward deck member 4.

In still another preferred embodiment of the invention, both the chain cutter blades 39 and the stationary cutter blades 49 are serrated, cadmium plated Ford Vinecutter blades, shaped to permit movement of chain cutter blades 39 with respect to stationary cutter blades 49 at relatively close tolerances.

It will be appreciated by those skilled in the art that alternative control systems may be employed in the invention according to the teachings therein to control the action of the sampling bucket in collecting samples. For example, the hydraulic control system may be replaced with an electrical switching system, and submersible electric motors used to activate and deactivate the hydraulic motors which drive the lift chain apparatus and the cutter chain assembly. An electrically operated system can also be substituted for the double-action hydraulic cylinder by use of levers according to the knowledge of those skilled in the art. Alternatively, a combination hydraulic and electrical system can be implemented, with the hydraulic cylinder operational to open and close the bucket bottom plates as described herein, and the lift chain and cutter chain systems electrically driven and activated. Further in the alternative, the hydraulic drive and control system can be pneumatic in design and operation, with the double-action hydraulic cylinder operated by air along with the lift chain and cutter chain drive motors, according to the disclosure of this invention.

Having described my invention with the particularity set forth above, what is claimed is:

1. An aquatic plant sampler comprising:
   (a) an aquatic craft; and
   (b) a sampling bucket carried by said aquatic craft for lowering into the water of a water body floating said aquatic craft and collecting plant and water bottom samples, said sampling bucket further comprising rotating cutter means for isolating said samples and bottom retracting means internally provided in said sampling bucket above said cutter means for receiving and holding said samples.

2. The aquatic plant sampler of claim 1 wherein said sampling bucket further includes an access door for removing said samples.

3. The aquatic plant sampler of claim 1 further comprising overhead rail means on said aquatic craft for suspending said sampling bucket over said water and lifting means carried by said overhead rail means for lowering and raising said sampling bucket into and out of said water, respectively.

4. The aquatic plant sampler of claim 1 further comprising overhead rail means for suspending said sampling bucket over said water and lifting means carried by said overhead rail means for lowering and raising said sampling bucket into and out of said water, respectively, and wherein said sampling bucket further includes an access door for removing said samples.

5. The aquatic plant sampler of claim 1 further comprising overhead rail means on said aquatic craft and trolley means movably carried by said overhead rail means, and wherein said sampling bucket is carried by said trolley means.

6. The aquatic plant sampler of claim 1 further comprising piston means cooperating with said bottom retracting means; drive means carried by said bucket and cooperating with said cutter means; and remote control means on said aquatic craft communicating with said piston means and said drive means for activating said rotating cutter means and said bottom retracting means at selected time intervals.

7. The aquatic plant sampler of claim 1 further comprising underwater propulsion means and above water propulsion means mounted on said aquatic craft.

8. The aquatic plant sampler of claim 1 further comprising overhead rail means for suspending said sampling bucket over said water and lifting means carried by said overhead rail means for lowering and raising said sampling bucket into and out of said water, respectively, and underwater propulsion means and above water propulsion means mounted on said aquatic craft.

9. The aquatic plant sampler of claim 1 further comprising anchors consisting of at least two poles carried by said aquatic craft and positioned in contact with the water bottom of said water body to stabilize said aquatic craft in position to collect said samples.

10. The aquatic plant sampler of claim 1 further comprising:
(a) Overhead rail means and trolley means movably carried by said overhead rail means and carrying said sampling bucket;
(b) Piston means cooperating with said bottom retracting means; drive means carried by said bucket and cooperating with said cutter means; and remote control means on said aquatic craft communicating with said piston means and said drive means for activating said rotating cutter means and said bottom retracting means when said sampling bucket is submerged to cut, receive and hold said samples;
(c) Under water propulsion means and above water propulsion means mounted on said aquatic craft; and
(d) At least two poles carried by said aquatic craft and positioned in contact with the water bottom of said water body to stabilize said aquatic craft in position to collect said samples.

11. An aquatic plant sampler comprising:
(a) an aquatic craft having a hole near the center thereof communicating with the water surface of a water body floating said craft;
(b) an overhead rail mounted on the deck of said aquatic craft above said hole;
(c) trolley means movably carried by said overhead rail for traversing said overhead rail;
(d) a chain lift motor mounted on said trolley;
(e) a lift chain in cooperation with said chain lift motor;
(f) a sampling bucket carried by said lift chain and suspended from said trolley means and movable up and down vertically, responsive to activation of said chain lift motor;
(g) a cutter chain means mounted on the bottom of said sampling bucket;
(h) a chain drive motor mounted on said sampling bucket in cooperation with said cutter chain means to drive said cutter chain means responsive to activation of said chain drive motor;
(i) retraction means mounted in the bottom of said sampling bucket to selectively retract and close said bottom; and
(j) remote control means on said aquatic craft for selectively activating said chain drive motor, said chain lift motor and said retraction means.

12. The aquatic plant sampler of claim 11 wherein said aquatic craft is characterized by a pair of pontoons having a deck mounted thereon with said hole provided in said deck between said pontoons.

13. The aquatic plant sampler of claim 11 further comprising a chain accumulator suspended from said overhead rail for storing, paying out, and accumulating said lift chain responsive to operation of said sampling bucket.

14. The aquatic plant sampler of claim 11 wherein said sampling bucket further includes a hinged access door for access to the interior of said sampling bucket.

15. The aquatic plant sampler of claim 11 wherein the bottom peripheral edge of said sampling bucket is provided with a set of downwardly extending stationary cutter blades, and said cutter chain means includes a chain race mounted on said sampling bucket near the bottom peripheral edge thereof above said stationary cutter blades; a chain cooperating with said chain race; and a set of chain cutter blades carried by said chain and substantially coextensive with said set of stationary cutter blades for rotation with respect to said set of stationary cutter blades.

16. The aquatic plant sampler of claim 11 further comprising a chain accumulator suspended from said overhead rail for storing, paying out, and accumulating said lift chain responsive to operation of said sampling bucket; and wherein:
(a) said aquatic craft is characterized by a pair of pontoons having a deck mounted therein with said hole provided in said deck between said pontoons;
(b) said sampling bucket further includes a hinged access door for access to the interior of said sampling bucket; and
(c) said sampling bucket is provided with a set of downwardly extending stationary cutter blades, and said cutter chain means includes a chain race mounted on said sampling bucket near the bottom peripheral edge thereof above said stationary cutter blades; a chain cooperating with said chain race; and a set of chain cutter blades carried by said chain and substantially coextensive with said set of stationary cutter blades for rotation with respect to said set of stationary cutter blades.

17. The aquatic plant sampler of claim 11 wherein said retraction means further comprises:
    (a) a plurality of essentially wedge-shaped bucket bottom plates forming the bottom of said sampling bucket when in closed configuration and joined to the inside of said sampling bucket by hinges;
    (b) a bucket lift plate disposed above said bucket bottom plates in essentially concentric relationship with respect to the side of said sampling bucket;
    (c) a plurality of bucket lift plate rods having one end mounted in spaced relationship on said bucket lift plate and each having the other end pivotally carried by one of said bucket bottom plates; and
    (d) means in cooperation with said bucket lift plate and responsive to said remote control means for selectively exerting an upward force on said bucket lift plate to cause said plurality of wedge-shaped bucket bottom plates to swing open on said hinges and define an opening in the bottom of said sampling bucket and for selectively exerting a downward force on said bucket lift plate to close said plurality of wedge-shaped bucket bottom plates.

18. The aquatic plant sampler of claim 17 wherein said means in cooperation with said bucket lift plate is a double-action hydraulic cylinder.

19. The aquatic plant sampler of claim 11 wherein:
    (a) said aquatic craft is characterized by a pair of pontoons having a deck mounted thereon with said hole provided in said deck between said pontoons;
    (b) said sampling bucket is constructed of perforated side and top material and further includes a hinged access door for access to the interior of said sampling bucket;
    (c) said sampling bucket is provided with a set of downwardly extending stationary cutter blades, and said cutter chain means includes a chain race mounted on said sampling bucket near the bottom peripheral edge thereof above said stationary cutter blades; a chain cooperating with said chain race; and a set of chain cutter blades carried by said chain and substantially coextensive with said set of stationary cutter blades for rotation with respect to said set of stationary cutter blades; and
    (d) wherein said retraction means further comprises:
        (a) a plurality of essentially wedge-shaped bucket bottom plates forming the bottom of said sampling bucket when in closed configuration and joined to the inside of said sampling bucket by hinges;
        (b) a bucket lift plate having apertures therein and disposed above said bucket bottom plates in essentially concentric relationship with respect to the side of said sampling bucket;
        (c) a plurality of bucket lift plate rods having one end mounted in spaced relationship on said bucket lift plate and each having the other end pivotally carried by one of said bucket bottom plates; and
        (d) means in cooperation with said bucket lift plate and responsive to said remote control means for selectively exerting an upward force on said bucket lift plate to cause said plurality of wedge-shaped bucket bottom plates to swing open on said hinges and define an opening in the bottom of said sampling bucket and for selectively exerting a downward force on said bucket lift plate to close said plurality of wedge-shaped bucket bottom plates.

20. The aquatic plant sampler of claim 19 wherein said remote control means is hydraulically activated and said chain drive motor and said chain lift motor are hydraulic motors.

* * * * *